United States Patent
Hurst

(10) Patent No.: US 9,407,955 B2
(45) Date of Patent: *Aug. 2, 2016

(54) CHUNKING OF MULTIPLE TRACK AUDIO FOR ADAPTIVE BIT RATE STREAMING

(71) Applicant: ECHOSTAR TECHNOLOGIES L.L.C., Englewood, CO (US)

(72) Inventor: Mark B. Hurst, Cedar Hills, UT (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/659,081

(22) Filed: Mar. 16, 2015

(65) Prior Publication Data

US 2015/0189366 A1 Jul. 2, 2015

Related U.S. Application Data

(63) Continuation of application No. 13/843,494, filed on Mar. 15, 2013, now Pat. No. 8,984,569.

(51) Int. Cl.
*B60Q 1/34* (2006.01)
*H04N 7/173* (2011.01)
(Continued)

(52) U.S. Cl.
CPC ............ *H04N 21/439* (2013.01); *G06F 15/16* (2013.01); *H04L 1/0002* (2013.01);
(Continued)

(58) Field of Classification Search
CPC ............ H04N 21/439; H04N 21/437; H04N 21/64322; H04N 21/8586; H04N 21/6587; H04N 7/17318; H04N 21/2662; H04N 7/173; H04N 9/8042; H04N 7/12; H04N 11/04; H04N 9/80; H04N 21/8106; H04N 21/845; H04L 65/602; H04L 65/607; H04L 65/4092; H04L 1/0083; H04L 29/06027; H04L 29/08072; H04L 67/108; H04L 29/06; H04L 67/06; H04L 67/02; H04L 1/0002; H04L 65/4084; H04L 65/60; G06F 15/16

USPC ............ 370/465, 472, 476, 535; 375/240.02; 386/336, 339, 340; 709/217, 219, 231; 725/86, 87, 90, 100, 105, 131, 139, 725/151

See application file for complete search history.

(56) References Cited

U.S. PATENT DOCUMENTS

2008/0195743 A1 8/2008 Brueck et al.
2011/0307545 A1* 12/2011 Bouazizi ........ H04N 21/234345
709/203

(Continued)

FOREIGN PATENT DOCUMENTS

WO 2009117326 A1 9/2009
WO 2012138895 A1 10/2012
WO 2012166816 A1 12/2012

OTHER PUBLICATIONS

The International Bureau of WIPO, International Preliminary Report on Patentability in International Application No. PCT/US2014/026102 mailed Sep. 24, 2015.

(Continued)

*Primary Examiner* — Hoang-Vu A Nguyen-Ba
(74) *Attorney, Agent, or Firm* — Ingrassia Fisher & Lorenz, P.C.

(57) ABSTRACT

Systems, devices and methods are provided to support multiple audio tracks in an adaptive media stream. Segments of the adaptive stream are encoded so that the player is able to locate and request a specific one of the available audio tracks using byte range requests or the like. Audio content can be removed from video segments, or at least moved to the end of the segments so that a byte range request obtains just the video content when the default audio is not desired. The audio content can be obtained from a separate audio segment. Indeed, multiple audio tracks can be packaged into a common audio segment so that byte range requests can obtain just the particular audio track desired.

20 Claims, 3 Drawing Sheets

Figure 1:
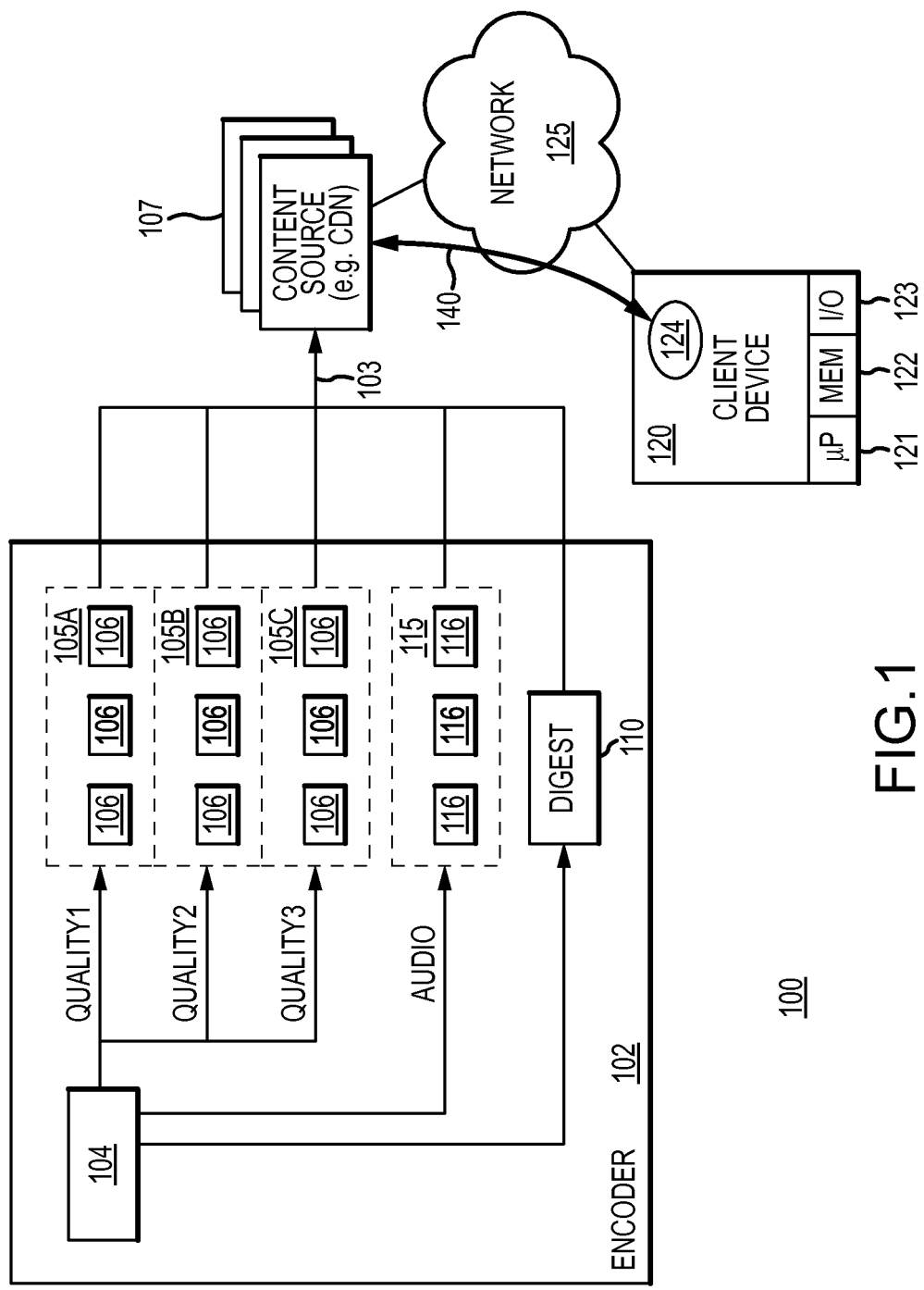

(51) Int. Cl.
| | |
|---|---|
| G06F 15/16 | (2006.01) |
| H04N 7/12 | (2006.01) |
| H04N 21/439 | (2011.01) |
| H04N 9/80 | (2006.01) |
| H04N 11/04 | (2006.01) |
| H04N 9/804 | (2006.01) |
| H04L 29/06 | (2006.01) |
| H04L 1/00 | (2006.01) |
| H04L 29/08 | (2006.01) |
| H04N 21/2662 | (2011.01) |
| H04N 21/485 | (2011.01) |
| H04N 21/81 | (2011.01) |
| H04N 21/845 | (2011.01) |
| H04N 21/6587 | (2011.01) |
| H04N 21/437 | (2011.01) |
| H04N 21/643 | (2011.01) |
| H04N 21/858 | (2011.01) |
| B60Q 7/02 | (2006.01) |
| B60Q 1/40 | (2006.01) |
| G08B 1/08 | (2006.01) |
| H04N 7/16 | (2011.01) |
| H04N 5/89 | (2006.01) |
| H04N 5/92 | (2006.01) |

(52) U.S. Cl.
CPC ............ *H04L 1/0083* (2013.01); *H04L 29/06* (2013.01); *H04L 29/06027* (2013.01); *H04L 29/08072* (2013.01); *H04L 65/4084* (2013.01); *H04L 65/4092* (2013.01); *H04L 65/60* (2013.01); *H04L 65/602* (2013.01); *H04L 65/607* (2013.01); *H04L 67/02* (2013.01); *H04L 67/06* (2013.01); *H04L 67/108* (2013.01); *H04N 7/12* (2013.01); *H04N 7/173* (2013.01); *H04N 7/17318* (2013.01); *H04N 9/80* (2013.01); *H04N 9/8042* (2013.01); *H04N 11/04* (2013.01); *H04N 21/2662* (2013.01); *H04N 21/437* (2013.01); *H04N 21/4856* (2013.01); *H04N 21/64322* (2013.01); *H04N 21/6587* (2013.01); *H04N 21/8106* (2013.01); *H04N 21/8456* (2013.01); *H04N 21/8586* (2013.01)

(56) References Cited

U.S. PATENT DOCUMENTS

| | | | |
|---|---|---|---|
| 2012/0023251 A1* | 1/2012 | Pyle ............... | H04N 21/234327 709/231 |
| 2013/0007200 A1* | 1/2013 | van der Schaar ... | H04L 43/0888 709/217 |
| 2013/0007263 A1* | 1/2013 | Soroushian ............ | H04L 47/12 709/224 |
| 2013/0160071 A1* | 6/2013 | Kim ................... | H04N 21/4396 725/131 |
| 2014/0119428 A1* | 5/2014 | Catchpole ........ | H04N 21/47217 375/240.02 |

OTHER PUBLICATIONS

European Patent Office International Searching Authority, International Search Report and Written Opinion mailed Jun. 30, 2014 for International Application No. PCT/US2014/026102.

Watson, M., "DASH: Considerations on Segment Duration", 94. MPEG Meeting; Oct. 11, 2010-Oct. 15, 2010; Guangzhou; (Motion Picture Expert Group or ISO/IEC JTC1/SC29/WG11), No. M18497, Oct. 28, 2010, XP030047087.

ISO/IEC, International Standard, ISO/IEC 23009-1, Information Technology—Dynamic Adaptive Streaming Over HTTP (DASH), Second Edition, May 15, 2014.

* cited by examiner

CHUNKING OF MULTIPLE TRACK AUDIO FOR ADAPTIVE BIT RATE STREAMING

PRIORITY CLAIM

This application claims priority of U.S. patent application Ser. No. 13/843,494, which was filed on Mar. 15, 2013 and is now U.S. Pat. No. 8,984,569, and which is incorporated herein by reference.

TECHNICAL FIELD

The present disclosure generally relates to adaptive media streaming, and more particularly relates to systems, devices and methods for processing audio content in an adaptive media stream.

BACKGROUND

Streaming media is commonly used to deliver television programs, movies and other digital media content over the Internet and other networks. At present, a variety of streaming audio, video and/or other media content is available to consumers. A large amount of video-on-demand (VOD) content, for example, is now available for network streaming from many different sources. Media streams are also used to deliver other types of media content including live and pre-recorded broadcast television, so-called "Internet (or IP) television", stored media content (e.g., content stored in a remote storage digital video recorder (RSDVR)), placeshifted media content and many others.

At present, most adaptive streams are encoded with a single audio track. This presents somewhat of a challenge, since multiple language programs typically require separate encoding for each language. The multiple encodings can require a large amount of processing resources, and the multiple copies that result can create a relatively large volume of data to be stored on a server or delivery network.

It is therefore desirable to create systems, device and methods to improve the processing and delivery of audio content in adaptive media streams. These and other desirable features and characteristics will become apparent from the subsequent detailed description and the appended claims, taken in conjunction with the accompanying drawings and this background section.

BRIEF SUMMARY

Various embodiments provide client or server systems, devices and/or methods to effectively deliver multiple audio tracks within a single adaptive video stream. Segments of the adaptive stream are encoded so that the player is able to locate and request a specific one of the available audio tracks with an audio segment using byte range requests or the like. Audio content can be removed from the video segments, or at least moved to the end of the segments so that a byte range request obtains just the video content when the default audio is not desired. The audio content can be obtained from a separate audio segment. Indeed, multiple audio tracks can be encoded into a common audio segment so that byte range requests can isolate just the particular audio track desired. Similar concepts could be equivalently applied to timed text (e.g., closed caption information) or other supplemental content as desired.

These and other embodiments, aspects and features are described in detail below.

BRIEF DESCRIPTION OF THE DRAWING FIGURES

Figure 2:
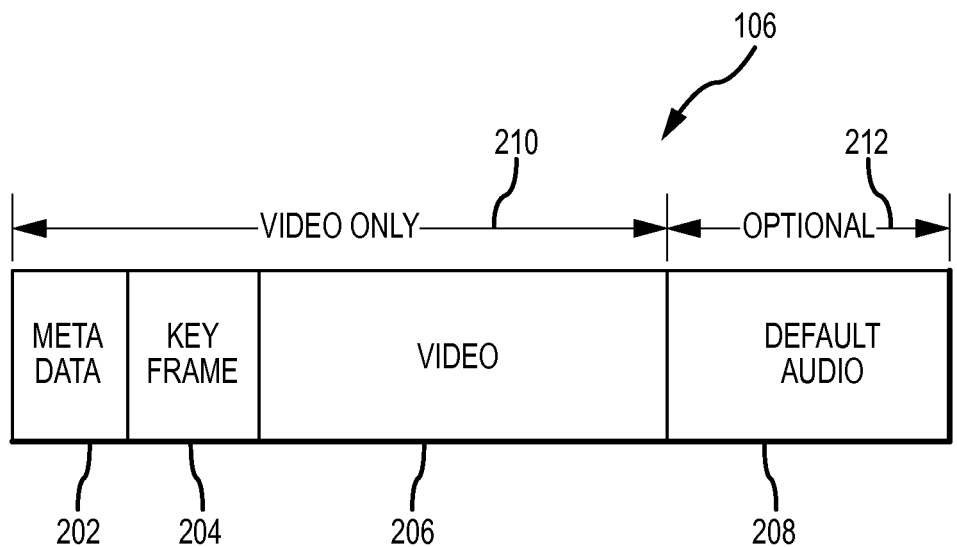
Figure 3:
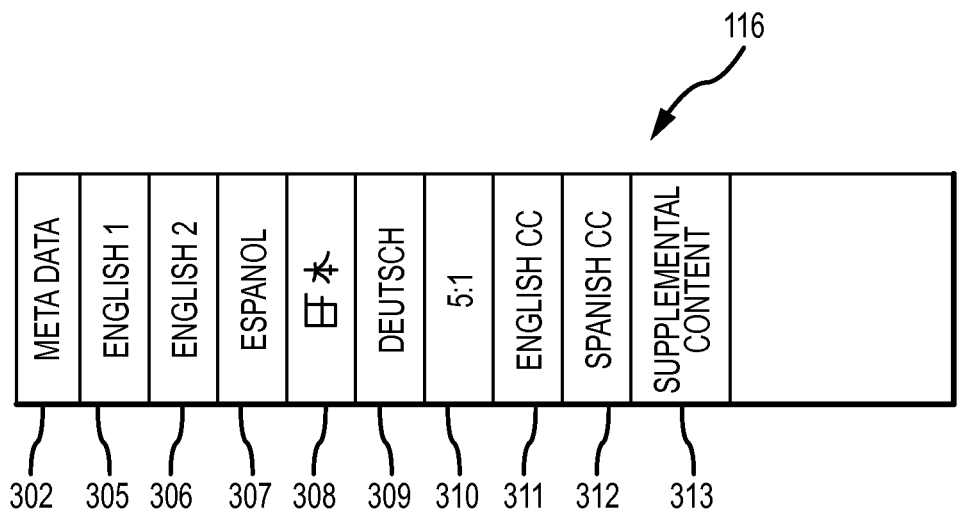
Figure 4:
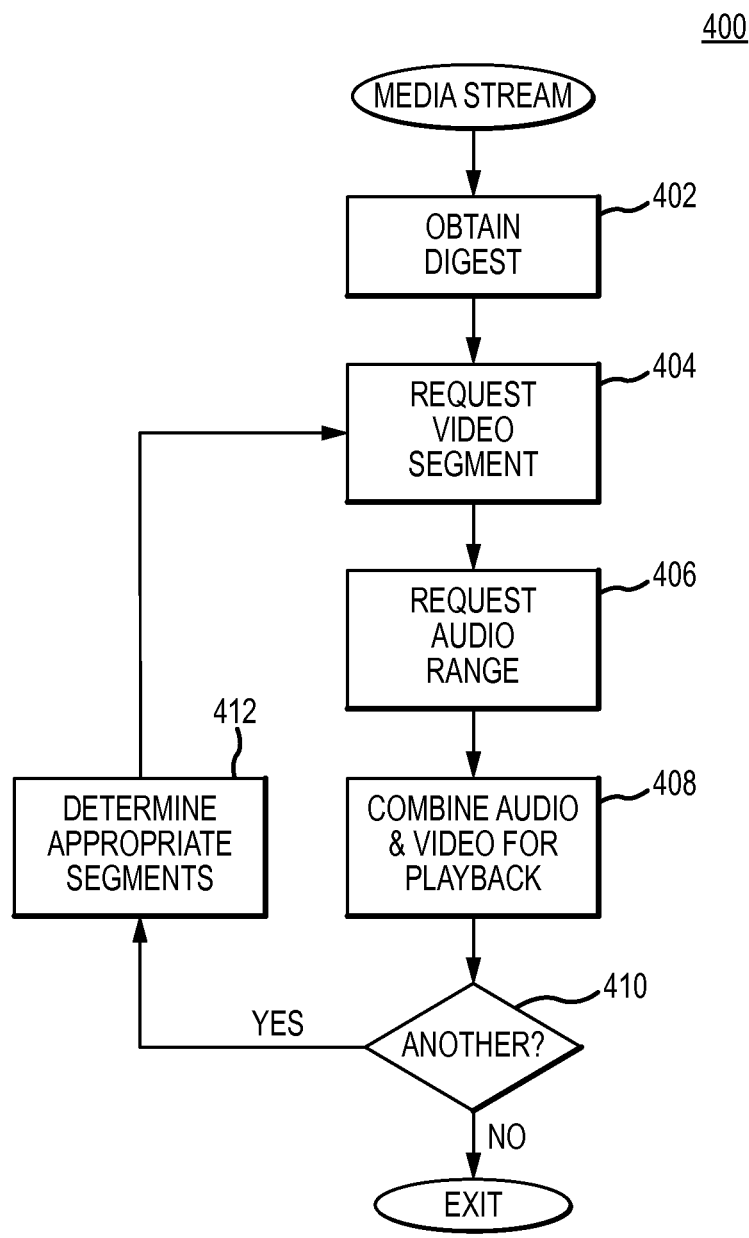

Exemplary embodiments will hereinafter be described in conjunction with the following drawing figures, wherein like numerals denote like elements, and FIG. 1 is a block diagram of an example system for delivering a media stream with enhanced audio segments; and FIG. 2 is a diagram of an example media segment that contains video data and default audio data;

FIG. 3 is a diagram of an example media segment that contains multiple audio tracks; and FIG. 4 is a flowchart of an example method for processing media segments with chunked audio content.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

FIG. 1 illustrates an exemplary system 100 to support adaptive media streaming with multiple audio tracks. The adaptive stream 103 is delivered over a network connection 140 between content source 107 and a client device 120. In various embodiments, the media stream 103 includes a sequence of segments 106 that are each constructed to arrange video information and default audio information so that the client device 120 is able to receive just the video portion of the segments if the default audio is not desired. Further, a separate set 115 of audio segments 116 provides chunks of data corresponding to each of the available audio tracks, as described more fully below. The media player 124 in the client device 120 is able to isolate requests for video data in segments 106 and for the desired portion(s) of the audio segments 116 using HTTP byte range addressing or other techniques as desired.

In conventional adaptive streaming, a media player application 124 executing on one or more client devices 120 contains intelligent logic to select appropriate video segments 106 as needed to obtain and playback the media program 104. Segments 106 may be interchangeable between sets 105A-C so that higher quality segments 106 are seamlessly intermixed with lower quality segments from different sets 105 to reflect changing network or other conditions. Typically, the media player application 124 initially obtains a digest 110 or other description of the available segments 106 so that the player itself can select and request the particular segments 106 that are desired. Since the segments 106 are typically stored as separate files, segment requests may take the form of conventional hypertext transport protocol (HTTP) constructs (e.g., HTTP "get" instructions) or the like over any sort of data connection 140. Such constructs are readily routable on network 125 and can be served by conventional CDN or other web-type servers 107, thereby providing a convenient mechanism for distributing adaptive media streams 103 to a variety of different client devices 120 on network 125.

To that end, connection 140 may be an HTTP session that supports the requesting and delivery of particular byte ranges within a requested segment 106 or 116. Byte serving, as described in HTTP specification version 1.1., is the process of sending only a portion of an HTTP message from a server 107 to a client 120. Byte serving typically uses the "Range HTTP" request header and the "Accept-Ranges" and "Content-Range HTTP" response headers, although other embodiments may use other techniques, including any sort of range addressing that is implemented in subsequent versions of HTTP or other protocols. Byte range addressing of this sort can allow media player application 124 to isolate the video content in segments 106 and/or a particular audio track in segments 116.

As described herein, each program 104 is appropriately encoded in a manner that allows chunking of multiple audio tracks into common audio segments 116. The relative locations of each audio track within the audio segment 116 can be made available to the client application 124 via digest 110, via information contained in one or more video segments 106, or in any other manner. Additional detail about the encoding of video segments 106 and audio segments 116 is provided below.

Client device 120 variously represents any sort of mobile phone, tablet PC, laptop or other PC, video game device, media player, or other consumer-type device that is operated by subscriber or other user. Client devices 120 are able to obtain and playback media content representing any number of different programs 104, including media streams 103 obtained from content source 107. Typically, client devices 120 will include any conventional processors 121, memory 122 and input/output interfaces 123 for supporting interactions with the user and/or connections 140 to network 125, as well as any other conventional resources commonly found in consumer-type computers and other electronic devices. It is not necessary that all client devices 120 be mobile devices; more stationary PCs, media players, video game players, televisions, set top boxes, television receivers and/or other components may be considered "client devices" if they provide the various functions described herein.

The example illustrated in FIG. 1 shows an encoder 102 that creates an adaptive stream 103 as described herein. Encoder 102 may be, for example, a digital computer system that is programmed to create multiple sets 105A-C of video segments 106 that each represent the same media program 104 in its entirety, but with different bit rates, frame rates, resolution and/or other levels of quality. Typically, each set 105A-C is made up of smaller segments 106 that each represents a small portion of the program content with a single data file, as described below. Sets 105A-C are typically encoded so that segments 106 of the different sets 105A-C are interchangeable with each other, often using a common timing index. This allows a client media player to mix and match video segments 106 from different sets 105A-C to create a media stream 103 that effectively adapts as network conditions or other conditions change. Although the term "video segments" is used herein to describe segments 106 containing video data, these segments 106 may also contain default or other audio data, as described below. Several examples of adaptive streaming systems, devices and techniques are described in US Patent Publication No. 2008/0195743. Other embodiments could use different encoding structures or techniques, as desired.

Encoder 102 also encodes one or more sets 115 of audio segments 116 to provide the various audio tracks to accompany the video content of the stream. Unlike most traditional streaming techniques that deliver audio and video data in a common segment 106, media player 124 separately obtains audio segments 116 and video segments 106 so that the desired audio track can be combined with the video at the media player 124. By combining the audio and video data at the player 124 rather than the encoder 102, system 100 is able to flexibly allow the player 124 to request any available audio track that may be available. Audio tracks could include any number of different languages, for example, as well as multiple stereo channels, audio with advanced encoding (e.g., 5.1 or other surround sound in any number of different formats), or even timed text data (e.g., closed caption information in one or more languages) or other supplemental content. Other types of audio or other data could be additionally or alternatively provided in any number of equivalent embodiments.

With continued reference to the example of FIG. 1, segments 106 and 116 of media stream 103 are stored on a content source 107 for distribution on the Internet or another network 125. Content source 107 may be, for example, an RSDVR server, a video-on-demand (VOD) server, or any other source of streaming media as desired. Various embodiments may distribute the various segments 106 or other streams using a content delivery network (CDN) or the like.

The various components of system 100 may be deployed under the control of one or more different entities. Typically, the subscriber or other user will maintain control over a media player or other client device 120, as described herein. In some implementations, encoder 102 and content source 107 are jointly operated by a content distributor such as a cable television operator, a direct broadcast satellite (DBS) service provider, broadcast network, or the like. Such a distributor would typically support multiple users, each with their own client devices 120. Other embodiments could separate the encoding, distributing and operating functions between different parties. A television network or other content producer could provide already-encoded media streams 103, for example, that could be made available via a commercially-available content delivery network (CDN) or other server 107. Any number of alternate arrangements could be formulated.

Turning now to FIG. 2, a video segment 106 may be encoded to include metadata 202, key frame data 204, video data 206, and default audio data 208 as desired. In some implementations, the various data fields 202-208 may be arranged in contiguous byte order such that the fields 202-208 are essentially arranged as shown in FIG. 2. This would allow a range request for byte range 210 to obtain just the video and key frame data of the segment 106, along with metadata 202 that could be used to process the remaining segment data. Requesting only range 210 would further eliminate the need to transfer audio 208, thereby saving the bandwidth that would otherwise be used to transfer byte range 212. Legacy segments 106 may be encoded with the audio portion 208 interposed between the video portion 206; the audio portion 208 could still be avoided, if desired, by placing two byte range requests for the segment bytes on either side of the audio data 206.

Metadata 202 contains information that allows the media player 214 to receive, parse and decode the segment 106. Metadata 202 could be augmented in some implementations to identify a corresponding audio segment 116 and/or the various byte ranges of multiple audio tracks that are contained in the audio segment 116. Media player 214 could alternately obtain information about the audio segments from digest 110 or any other source, as desired. Metadata 202 could also contain the byte ranges of the next segment 106 in the same set 105, if desired, so that the player 214 could place accurate byte range requests for the next segment 106 in stream 103 that has the same quality as the current segment. Other embodiments may provide additional or alternate information, as appropriate.

Some embodiments could encode segments 106 without any audio data 208 at all, if desired. By maintaining default audio in the segments 106, however, a number of benefits are provided. First, many players 124 may only want the default audio 208, so providing the default audio 208 would eliminate the need to obtain separate audio 116 if such features are not desired. Moreover, although byte addressing is part of the HTTP/1.1 standard, it is not presently universally implemented. As a result, byte requests placed across certain networks 125, CDNs or servers 107 may result in errors or other anomalies. Maintaining some audio data 208 in segments 106 could therefore prevent issues in many practical embodiments.

FIG. 3 shows an exemplary audio segment 116 that includes several different audio tracks 305-310, any of which may be independently obtained to process any of the various audio formats or languages. Note that if byte range addressing is not available for any reason, some embodiments could request and receive the entire segment 116 as a file, keep whichever portions 302-312 of the file were desired, and discard the remainder.

As illustrated in FIG. 3, audio segment 116 includes metadata 302 that provides additional information about segment 116, such as the particular byte ranges of the various portions 302-312, descriptions of the content contained in the various portions 302-312, information about subsequent segments 116 in set 115, and/or any other information as desired. In many embodiments, however, metadata 302 may not be needed, particularly if the byte ranges and other information are otherwise provided in the video segments 106, in the digest 110, and/or in any other location as desired.

Video segments 106 typically represent a consistent time slot of the media stream 103 (e.g., two seconds or so, in some implementations). The various video segments 106 are typically indexed to a consistent time reference so that segments 106 encoded at different quality levels (sets 105A-C) can be mixed and matched as desired. Many embodiments will follow the same time indexing for audio segments 116 (e.g., so that segments 106 and 116 correspond in time). Consistent timing between segments 106 and 116 may be particularly beneficial if the default audio 208 in segments 106 is used. In other embodiments, however, it may not be necessary that audio segments 116 follow the same timing as video segments 106. Since audio data typically consumes less bandwidth than video data, it may be possible to deliver more audio content with each segment 116 (e.g., on the order of 4-5 seconds or so) to reduce the number of requests and responses placed on connection 140. Other embodiments may configure the particular timing and duration parameters in other ways.

The example segment 116 shown in FIG. 3 contains five portions 305-309 corresponding to two channels 305, 306 of English audio, one channel of Spanish audio, one channel 308 of Japanese audio and a channel 309 of German audio. The two channels 305, 306 could represent two separate channels of stereo sound, for example, or simply two different dialect of the same language as desired. Of course any other languages or other audio tracks could be added, as desired.

Example segment 116 also includes a channel 310 for digital surround sound, as desired. In some implementations, additional channels 310 could be added to support different audio encoding standards or the like.

Channels 311 and 312 provide timed text data such as closed captioning in any language(s). Timed text 311, 312 may not be needed in all implementations, but may be present if desired. Supplemental content 313 may also be provided; such content may include text, still images, audio or even video as desired. In various embodiments, timed text 311, 312 and/or supplemental content 313 provide data contained in an MPEG stream associated with the original program 104, as desired. Different audio channels may be similarly extracted from MPEG streams when available.

FIG. 4 is a flowchart of an example method 400 to process chunked audio content in an adaptive media stream 103. The various functions of method 400 may be carried out by media player application 124 or other logic executing on processor 121 of client device 120, or by any other programmed logic executing on any other data processing hardware as desired.

Programs 104 may be initially selected for viewing in any manner. In various embodiments, a user selects a program 104 from available content described in a web page or application that is viewable on client device 120. The program 104 may be located in an RSDVR, VOD server or other service provided by content source 107, as desired.

Media player application 124 initially obtains the digest no associated with the selected program 104 (function 402). Typically, the digest 110 is obtained by placing an HTTP "get" command to a URL on server 107 that is associated with program 104. Digest 110 contains additional information about media stream 103 that allows the media player application 124 to locate and request segments 106 and 116 as needed.

To that end, media player application 124 suitably requests video segments 106 that include video content encoded at a quality level that is appropriate for the then-current network and processing conditions. These segments 106 are typically stored as files on content source 107 that can be accessed using URLs or other naming conventions that are specified in the digest 110. As noted above, segments 106 may be encoded so that the metadata 202 about the segment 106 and the video data 206 are in a relatively contiguous byte range of the segment file so that any unwanted default audio 208 in the segment 106 avoided. Note that in some implementations, a key frame 204 or other content may be located in the byte range between the metadata 202 and video data 206, as desired.

Media player application 124 separately requests audio segments 116, as appropriate (function 406). As noted above, many embodiments may request only certain ranges 302-313 of the audio segments 116 using byte range request or the like, rather than requesting the entire audio segment file 116. The media application 314 could ascertain the relevant byte ranges in audio segments 116 using data obtained from digest 110, metadata 202 and/or 302, previous segments 106 or 116, or from any other location. Application 314 may request multiple portions 302-313, as desired, using multiple byte range requests or the like. Again, some embodiments may request the entire segment 116 even though one or more portions 302-313 will ultimately be discarded.

The media player 124 executing on client device 120 combines the audio and video portions of the media stream for playback to the viewer (function 408). The media player 124 is therefore able to select any of the available audio tracks 303-313 for playback, eliminating the need to separately encode sets of segments 106 with different language and/or audio formats. This allows for compact storage, as well as more efficient encoding of media stream 103.

Playback continues throughout the duration of program 104 (function 410). As noted above, the media player 124 is able to "upshift" to better quality segments 106 when conditions allow, or to "downshift" to lesser quality if network or processing bandwidth degrades during playback. This ability to determine appropriate segments 106 (function 410) is not diminished by providing separate audio segments 116, so the method 400 retains the substantial benefits of adaptive streaming under the control of the media player application 124 executing on the client device 120.

The foregoing discussion therefore considers various systems, devices and methods to deliver a media stream having multiple audio tracks to a client device. The general concepts set forth herein may be adapted to any number of equivalent embodiments. Although the discussion herein frequently considers network 125 to be the Internet or a similar network, for example, equivalent concepts could be applied to other public/private/hybrid networks, telephone networks, and/or the like. Many other enhancements, modifications and other changes could be made in a wide array of alternate but equivalent embodiments.

The term "exemplary" is used herein to represent one example, instance or illustration that may have any number of alternates. Any implementation described herein as "exemplary" is not necessarily to be construed as preferred or advantageous over other implementations, nor is it intended to represent a model implementation to be duplicated. While several examples have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a client device to playback an adaptive media stream having a plurality of different audio tracks, the method comprising:
receiving a digest of the media stream at the client device that describes a series of data files representing the media stream, wherein at least some of the data files comprise portions of each of the plurality of audio tracks of the adaptive media stream, and wherein the portions of the different audio tracks are described by the digest;
requesting, by the client device, portions of at the data files described by the digest as corresponding to a desired one of the plurality of different audio tracks to thereby obtain audio segments of the desired audio track, wherein the requested portions of the audio tracks are each less than the entire data file; and
rendering the obtained audio segments of the desired audio track for playback so that the media stream is presented for playback with the desired one of the plurality of different audio tracks.

2. The method of claim 1 wherein the requesting of portions of the data files comprises requesting only a byte range of the data file corresponding to the desired audio track.

3. The method of claim 2 wherein the byte range is specified in the digest.

4. The method of claim 2 wherein the byte range is requested using an HTTP byte range request.

5. The method of claim 1 wherein at least some of the data files comprise video data and default audio data, and wherein the method further comprises requesting only the video data but not the default audio data.

6. The method of claim 5 wherein requesting only the video data comprises requesting only a byte range of the video segment corresponding to the video data but not a second byte range corresponding to the default audio data.

7. The method of claim 6 wherein the byte range is specified in the digest.

8. The method of claim 7 wherein the byte range is requested using an HTTP byte range request.

9. The method of claim 1 wherein the receiving comprises receiving only the requested portion of the audio segment corresponding to the desired audio track without receiving the remainder of the audio segment corresponding to the other audio tracks.

10. The method of claim 9 wherein the requested portion is defined as a byte range that is specified in the digest.

11. A media player device to playback a media stream obtained from a server on a digital network, wherein the media stream has a plurality of different audio tracks, the media player device comprising:
an interface to the network; and
a processor configured to:
receive a digest of the media stream at the interface that describes a series of data files representing the media stream, wherein at least some of the data files comprise portions of each of the plurality of different audio tracks of the media stream, and wherein the portions of the different audio tracks are described by the digest;
request portions of at the data files described by the digest as corresponding to a desired one of the plurality of different audio tracks to thereby obtain audio segments of the desired audio track, wherein the requested portions are each less than the entire data file; and
render the obtained audio segments of the desired audio track for playback so that the media stream is presented for playback with the desired one of the plurality of different audio tracks.

12. The media player device of claim 11 wherein the requested portions of the data files are defined by a byte range corresponding to the desired audio track.

13. The media player device of claim 12 wherein the byte range is specified in the digest.

14. The media player device of claim 12 wherein the byte range is requested using an HTTP byte range request.

15. The media player device of claim 11 wherein the processor is further configured to request at least some of the data files that comprise video data and default audio data, and wherein only the video data is requested without the default audio data.

16. The media player device of claim 15 wherein the processor requests only a byte range of the video data but not a second byte range corresponding to the default audio data.

17. The media player device of claim 16 wherein the byte range is specified in the digest.

18. The media player device of claim 17 wherein the byte range is requested using an HTTP byte range request.

19. The media player device of claim 11 wherein only the requested portion of the audio segment corresponding to the desired audio track is received without receiving the remainder of the audio segment corresponding to the other audio tracks.

20. The media player device of claim 19 wherein the requested portion is defined as a byte range that is specified in the digest.

* * * * *